United States Patent [19]

Laue

[11] 4,355,896
[45] Oct. 26, 1982

[54] CLOUD COVER SENSOR

[76] Inventor: Robert A. Frosch, Administrator of the National Aeronautics and Space Administration, with respect to an invention of Eric G. Laue, San Marino, Calif.

[21] Appl. No.: 163,837

[22] Filed: Jun. 27, 1980

[51] Int. Cl.³ .......................... G01J 1/26; G01J 1/42
[52] U.S. Cl. .................................. 356/222; 250/203 R
[58] Field of Search .................. 356/222, 218; 250/203 R; 126/425

[56] References Cited

U.S. PATENT DOCUMENTS

| | | | |
|---|---|---|---|
| 4,041,307 | 8/1977 | Napoli et al. | 250/203 R |
| 4,146,784 | 3/1979 | Yekutieli | 250/203 R |
| 4,225,781 | 9/1980 | Hammons | 250/203 R |

*Primary Examiner*—Bruce Y. Arnold
*Attorney, Agent, or Firm*—Monte F. Mott; John R. Manning; Thomas H. Jones

[57] ABSTRACT

An apparatus is described which provides a numerical indication of the cloudiness at a particular time of a day. The apparatus includes a frame (18) holding several light sensors such as photovoltaic cells, with a direct sensor (12) mounted to directly face the sun and indirect sensors (13-16) mounted to face different portions of the sky not containing the sun. A light shield (30) shields the direct sensor from most of the sky except a small portion containing the sun, and also shields each of the indirect sensors from direct sunlight. The relative values of the outputs from the direct and indirect sensors, enables the generation of a numerical indication (56) of the degree of cloudiness at a particular time of day.

10 Claims, 3 Drawing Figures

U.S. Patent
Oct. 26, 1982
4,355,896
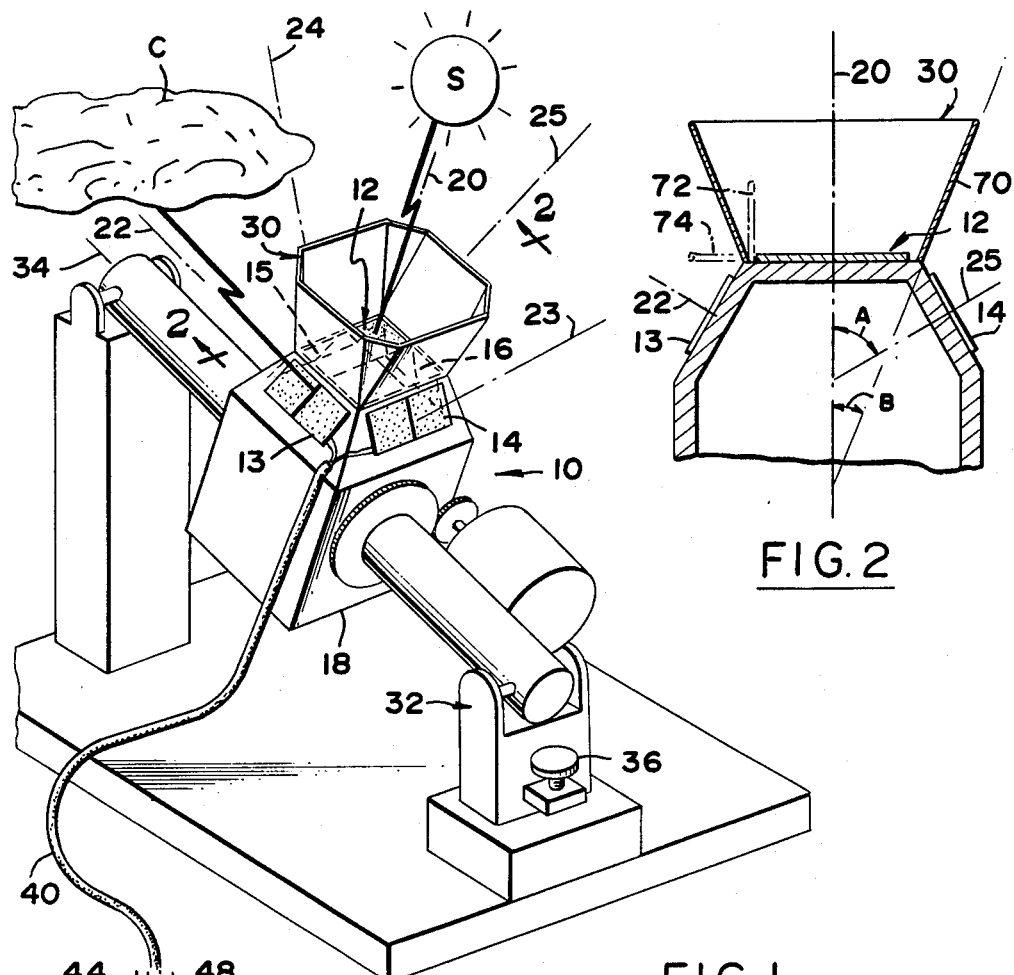
FIG. 1
FIG. 2
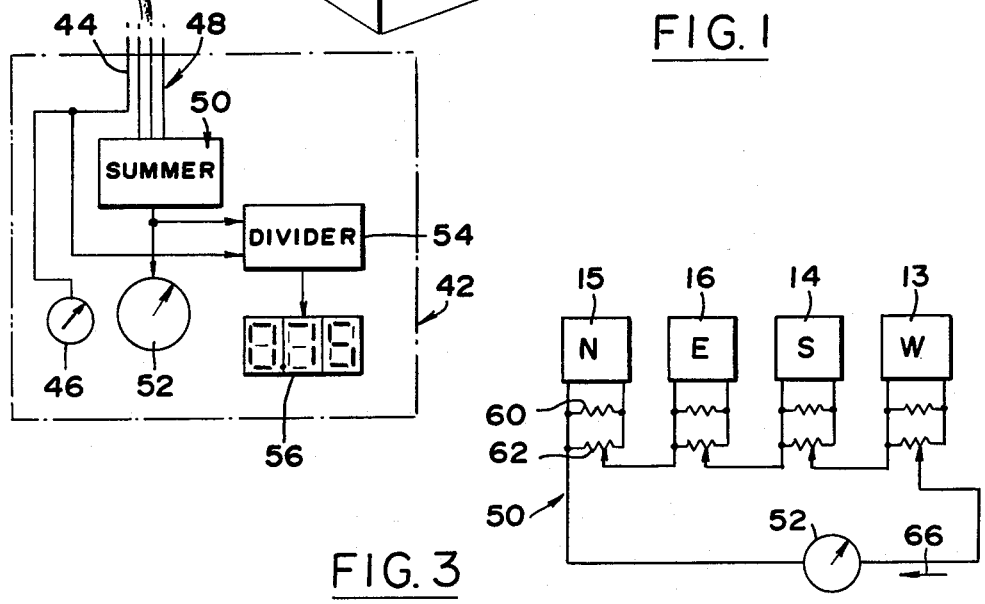
FIG. 3

CLOUD COVER SENSOR

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

TECHNICAL FIELD

This invention relates to apparatus for measuring the degree of cloudiness, by measuring the amount of light received from various areas of the sky.

BACKGROUND ART

The extent of cloud cover is of interest to meterologists as an aid in making weather predictions and for evaluating climatic factors, in evaluating the performance of solar energy collectors and converters, and in other applications. The degree of cloudiness can be evaluated by several available techniques, but they are time consuming and often do not provide a simple number that can be utilized in comparing the cloudiness of different days or different areas. For example, a photograph of the hemisphere can be taken by the use of a fish eye lens, but interpretation of the photograph requires determination of the relation between darkness or opacity of each area of the photograph and the intensity of the light causing the opacity, as well as a measurement of the areas of different opacities of the photograph. A relatively simple device which provided an indication of cloudiness with little effort and at low cost, even if with only moderate accuracy, would be of value in many applications.

DISCLOSURE OF INVENTION

In accordance with one embodiment of the present invention, a cloud cover sensor apparatus is provided which enables the generation of an indication of cloudiness using relatively low cost and easily operated equipment. The apparatus includes a frame holding several light sensors such as photovoltaic cells, including a group of indirect sensors positioned so that when a predetermined axis of the frame is directed towards the sun, the indirect sensors face most of the sky area not covered by the sun. A shield is provided to prevent direct sunlight from reaching the indirect sensors. The total output of the group of indirect sensors, adjusted for the amount of direct sunlight available, provides an indication of the cloudiness of the sky. The amount of sunlight available can be determined by providing a direct sensor mounted to face along the axis which is directed towards the sun, and by constructing the shield to prevent light from most of the sky lying away from the sun from falling on the direct sensor. Continuous operation of the apparatus can be achieved by mounting the frame on an equitorial mount and providing a motor to turn it so that the axis of the frame follows the sun in its movement across the sky.

BRIEF DESCRIPTION OF THE DRAWINGS

FIG. 1 is a perspective view of a cloud cover detector apparatus constructed in accordance with one embodiment of the present invention;

FIG. 2 is a partial sectional view taken on the line 2—2 of FIG. 1;

FIG. 3 is a partial schematic diagram of the apparatus of FIG. 1.

BEST MODE FOR CARRYING OUT THE INVENTION

FIG. 1 illustrates a cloud sensor 10 which includes five photovoltaic cells 12-16 mounted on a frame 18. One of the cells 12 (which is formed of four sub-cells) serves as a direct sunlight sensor, because it is positioned on the frame to face along a predetermined axis 20 that extends towards the sun S. The other four sensors 13-16 (which are each formed of two sub-cells) serve as indirect sensors, in that they are positioned to face along lines of sight 22-25 extending in different compass directions so as to collectively face most of the sky area illuminated by indirect sunlight, and to face most of the clouds C in the sky. A shielding apparatus 30 is mounted on the frame to shield the direct sensor 12 from most of the sky area around the sun, and to shield the indirect sensors 13-16 from direct sunlight. The frame 18 is mounted on an equitorial mount 32 tilted from the horizontal so that simple rotation of the frame about the axis 34 of support enables the direct sensor 12 to follow the sun in its movement across the sky. An adjustment mechanism 36 is provided to adjust the incline so as to account for changes in the sun's maximum declination with time of year and longitude.

The five sensors 12-16 are connected through a flexible cable 40 to an indicating apparatus 42 which can provide an indication of the cloudiness of the sky. The output 44 of the direct sunlight sensor 12 is delivered to a meter 46 which can be utilized to indicate the intensity of the sun. The outputs of the four indirect sensors are delivered over line 48 to a summer 50 which generates a signal having a value proportional to the sum of the outputs of the four indirect sensors. This signal is delivered to another meter 52 which indicates the amount of sunlight illuminating most of the sky around the sun. The output of the summer 50 as well as the output over line 44 from the direct sunlight sensor, is also delivered to a divider circuit 54 which generates an output indicating the ratio of the light sensed by the four indirect sensors to light sensed by the direct sunlight sensor. This ratio, which is delivered to a display 56, can be considered to be an adjusted cloudiness indication, which is high when there are no clouds in the sky and which decreases as the amount of clear sky area decreases. The indication is automatically adjusted for the declination of the sun, which varies with the time of day and season of the year, since the lower the angle of the sun from the horizon, which reduces the sum of outputs of the indirect sensors even on a clear day, the lower the output of the direct sensors.

FIG. 3 indicates one circuit which can be utilized for the summer 50 of FIG. 1. The circuit includes a small resistor 60 across each cell, for operating it in an almost short circuit mode. This is desirable because typical silicon photovoltaic cells produce an output substantially proportional to the amount of light falling on them when in a short circuit mode of operation (when at constant temperature). For a photovoltaic cell which is a square of two centimeters on each side, a resistor 60 is about one-half ohm can be utilized, to produce an output of about forty millivolts at peak sunlight illumination. A potentiometer 62 connected across each small resistor is set at a resistance (such as 100 ohms) which will provide about the same output from each cell when all are illuminated identically. The total current, from all cells indicated by arrow 66, is indicated on the meter 52. Obviously, a wide variety of circuits can be utilized to determine the outputs of the indirect cells, as by taking their sum, their average, or some other function of them. In FIG. 1, the divider 54 can be a digital calculating circuit with analog-to-digital inputs, and which is connected through a driver to a digital display 56 which provides a number indicating the cloudiness of the sky.

As shown in FIG. 2, the shielding apparatus 30 includes several plate-like portions such as portion 70 which serves to simultaneously shield the direct sensor 12 from most of the sky and the indirect sensor such as 14 from direct sunlight. In this example, the line of sight 25 of the indirect sensor 14 extends at an angle A of 60° from the axis 20 along which the direct sensor faces. The shield portion 70 lying between the two axes 20 and 25 extends at an angle B of about 20° from the axis 20. The size and orientation of the shield portion 70 is chosen to prevent any direct sunlight from reaching the indirect cell 14 despite several degrees of angular misalignment of the axis 20 with the sun, while minimizing the amount of sky area around the sun viewed by the direct sensor 12. It would be possible to utilize two shields such as those indicated at 72 and 74 between the axis 20 and each indirect line of sight such as 22. However, while the shield at 72 would effectively shield the direct sensor 12, the other shield 74 would block a significant portion of the sky area from the indirect sensor 13 while shielding it from direct sunlight. If very long shield portions such as 70 can be utilized, then the angle B can be reduced accordingly.

The degree of cloudiness can be indicated by merely sensing the outputs of the indirect sensors 14-16 and utilizing another means to account for changes in the angle of the sun above the horizon. For example, a simple table can be utilized to provide an adjustment factor based upon the time of day and season of the year, or a clock mechanism can be utilized to account for changes in the time of the day with adjustments to be made for different seasons of the year. However, so long as an electrical output is to be manipulated, the addition of a direct sunlight sensor for enabling an adjustment for the declination of the sun provides a simple means of adjusting for the time of day and season. In operating the device, it is desirable to take note of the possibility that a cloud may come between the sun and the direct sensor 12, in which case the output of the direct sensor cannot be utilized in determining cloudiness, and it may be necessary to wait for the cloud to drift away or to look up the values in a table. A filtering mechanism can be utilized to sense when the output of the direct sensor 12 changes more rapidly than would be encountered merely by change in declination of the sun during the day.

Thus, the invention provides a cloud cover detector apparatus which is simple in construction and operation, that can indicate the degree of cloudiness. This is accomplished by the use of a group of indirect light sensors mounted on a frame to face in different directions so that the group receives light from most of the sky, and by also providing a shielding means that shields each of the group of indirect sensors from direct sunlight. The group of indirect sensors can be mounted on a frame that can move to follow the sun, so that the sensors continue to sense almost all of the sky except that occupied by the sun, during movement of the sun across the sky. An adjustment for changes in the declination of the sun, as with time of day and season of the year, can be provided by utilizing a direct sunlight sensor which is mounted on the frame and which directly faces the sun. The shield means can be formed to shield the direct sensor from most of the sky area around the sun to minimize the influence of light from the rest of the sky. In one apparatus, an indication of cloudiness is obtained by the use of a circuit that indicates the ratio of indirect sunlight received from most of the sky area except the part occupied by the sun, as is sensed by the indirect sensors, to the light received directly from the sun by the direct sensor.

I claim:

1. Cloud cover detector apparatus comprising:
a frame which has a predetermined axis that can extend towards the sun;
a plurality of indirect sensors, which sensors generate outputs dependent upon the amount of sunlight incident thereon, mounted on said frame to face along lines which are angled by less than 90° from said axis and are also angled from one another so as to extend in different directions;
shield means mounted on said frame, for shielding each of said indirect sensors from direct sunlight when said frame is oriented so that said axis extends towards the sun; and
means responsive to the output of said indirect sensors for indicating the cloudiness of the sky.

2. The apparatus described in claim 1 including:
means for positioning and moving said frame so that said predetermined axis points substantially towards the sun to follow movement of the sun across the sky.

3. The apparatus described in claim 1 wherein:
said shield means comprises a plurality of substantially planar members, each of which extends along a plane positioned between said axis and said one line, but at a smaller angle to said axis than to said one line.

4. The apparatus described in claim 1 including:
a direct sunlight sensor mounted on said frame to face along said axis, said means for indicating cloudiness constructed to generate an indication based upon the output of said direct sensor as well as said indirect sensor.

5. Cloud cover detector apparatus comprising:
a frame;
a direct solar sensor mounted on said frame to face along a predetermined axis;
a plurality of indirect solar sensors mounted on said frame to face along lines angled by less than 90° from said axis and with the lines extending in different directions as seen in a view taken along said axis; and
a shield mounted on said frame and having a plurality of shield portions substantially in the form of plates, each portion extending between and at an angle to said axis and to one of said lines.

6. The apparatus described in claim 5 wherein:
each of said shield portions extends along a plane which makes an angle with respect to said axis that is smaller than the angle between said plane and the one of said lines.

7. A method for sensing cloudiness comprising:
positioning a first sunlight sensor so it faces the sun;
positioning a group of additional light sensors so they face most of the sky areas around the sun;

shielding each of the additional sensors from direct sunlight and shielding the first sensor from most of the sky area away from the sun; and comparing the output of said first sensor with the output of said group of additional sensors.

8. The method described in claim 7 wherein:

said step of comparing includes generating an output representing the ratio of the output of said first sensor to the outputs of said additional sensors.

9. Cloud cover detector apparatus comprising:

a frame which has a predetermined axis that can extend towards the sun;

a direct sunlight sensor mounted on said frame to face along said axis;

a plurality of indirect sensors mounted on said frame to face along lines which are angled from said axis and also angled from one another to extend in different directions;

shield means mounted on said frame, for shielding each of said indirect sensors from direct sunlight when said frame is oriented so that said axis extends towards the sun;

said direct and indirect sensors having electrical terminals and each sensor producing an electrical output of a magnitude substantially proportional to the amount of light incident thereon; and an electrical circuit connected to said sensors for generating an output indicating substantially the ratio of the outputs of said indirect and direct sensors.

10. Cloud cover detector apparatus comprising:

a frame;

a direct solar sensor mounted on said frame to face along a predetermined axis;

a plurality of indirect solar sensors mounted on said frame to face along lines which are angled from said axis and which lines extend in different directions as seen in a view taken along said axis;

a shield mounted on said frame and having a plurality of substantially planar shield portions, each shield portion extending between and at an angle to said axis and to one of said lines;

each of said sensors producing an electrical output proportional to the amount of light incident thereon; and a circuit which indicates the ratio between the outputs of said direct and indirect solar sensors.

* * * * *